United States Patent [19]
Saotome et al.

[11] Patent Number: 5,857,037
[45] Date of Patent: Jan. 5, 1999

[54] IMAGE PROCESSING METHOD AND APPARATUS

[75] Inventors: Shigeru Saotome; Eiji Ogawa, both of Kanagawa-ken, Japan

[73] Assignee: Fuji Photo Film Co., Ltd., Kanagawa-ken, Japan

[21] Appl. No.: 611,488

[22] Filed: Mar. 5, 1996

[30] Foreign Application Priority Data

Mar. 6, 1995 [JP] Japan .................................. 7-045188

[51] Int. Cl.$^6$ .............................. G06K 9/40; H04N 1/40
[52] U.S. Cl. ...................... 382/264; 382/254; 382/266; 358/447; 358/448
[58] Field of Search .................................. 382/264, 254, 382/260, 266; 358/447, 448

[56] References Cited

U.S. PATENT DOCUMENTS

| | | | |
|---|---|---|---|
| 4,315,318 | 2/1982 | Kato et al. | 364/515 |
| 4,672,463 | 6/1987 | Tomohisa et al. | 358/447 |

*Primary Examiner*—Thomas D. Lee
*Attorney, Agent, or Firm*—Sughrue, Mion, Zinn, Macpeak & Seas, PLLC

[57] ABSTRACT

A digital image signal, which represents values of picture elements arrayed along X and Y directions of an image, is subjected to operation processing carried out with the formula $$Q'=Q_{org}+\beta(Q_{org}-Q_{us}),$$

wherein $Q_{org}$ represents the original image signal representing each picture element, $Q_{us}$ represents an unsharp mask signal corresponding to super-low frequency with respect to the picture element, and $\beta$ represents an emphasis coefficient. The image signal obtained from the operation processing is fed into a reproducing apparatus, which reproduces an image by operations for scanning along X and Y directions. The operation processing is carried out with respect to the X and Y directions, under characteristics varying for different directions, and in accordance with a difference between responses of the reproducing apparatus along the X and Y directions. Final levels of sharpness of a visible image, which is reproduced by the reproducing apparatus, along the X and Y directions are thereby adjusted to be approximately equal to each other.

16 Claims, 2 Drawing Sheets

IMAGE PROCESSING METHOD AND APPARATUS

BACKGROUND OF THE INVENTION

1. Field of the Invention

This invention relates to an image processing method and apparatus. This invention particularly relates to a frequency emphasis processing method and apparatus, wherein frequency emphasis processing is carried out such that the levels of sharpness of a reproduced visible image along X and Y directions may become approximately equal to each other.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image, which has good image quality and can serve as an effective tool in, particularly, the efficient and accurate diagnosis of an illness.

With the radiation image recording and reproducing systems described above, the problems are encountered in that a frequency region, which is related to a diagnosis, or the like, is not accurately illustrated in a reproduced radiation image, and in that the contrast and the sharpness of the reproduced radiation image are low and thus a visible image, which has good image quality and can serve as an effective tool in, particularly, the efficient and accurate diagnosis of an illness, cannot be obtained. In view of the above circumstances, in U.S. Pat. No. 4,315,318, the applicant proposed an image processing method, which can improve the efficiency and accuracy of a diagnosis, or the like, by emphasizing the frequency components, which are not lower than super-low frequency and are related to a diagnosis, or the like.

With the proposed image processing method, a digital image signal, which represents picture element values of picture elements arrayed along X and Y directions of an image, is subjected to operation processing carried out with the formula $$Q' = Q_{org} + \beta(Q_{org} - Q_{us}) \quad (1)$$

wherein $Q_{org}$ represents the original image signal representing each picture element, $Q_{us}$ represents the unsharp mask signal corresponding to the super-low frequency with respect to the picture element, and $\beta$ represents the emphasis coefficient.

The unsharp mask signal $Q_{us}$ corresponding to the super-low frequency is the signal representing the density of each picture element of an unsharp image, which has been obtained by rendering the original image unsharp such that the unsharp image may contain only the frequency components lower than the super-low frequency.

When the radiation image is reproduced from the new image signal Q', which has been obtained from the aforesaid operation processing, a reproduced visible radiation image can be obtained, in which the frequency components, that are not lower than the super-low frequency and are related to a diagnosis, or the like, have been emphasized and which has good image quality and can serve as an effective tool in, particularly, the efficient and accurate diagnosis of an illness.

In such cases, as an image reproducing apparatus, an apparatus is ordinarily used which is constituted to reproduce an image by operations for scanning along X and Y directions. Examples of such image reproducing apparatuses include a cathode ray tube (CRT) display device, a thermal recording apparatus utilizing a thermal head, and a light beam scanning recording apparatus. However, it has heretofore been found that, in cases where the image reproducing apparatus of this type is used, the problems occur in that the levels of sharpness of the reproduced visible image along X and Y directions become different from each other. It is considered that the aforesaid problems occur due to a difference between the responses of the image reproducing apparatus along the X and Y directions.

The sharpness of a reproduced image can be adjusted by changing the emphasis coefficient $\beta$ in the aforesaid operation processing. Therefore, the emphasis coefficient $\beta$ may be set to be comparatively large, and the sharpness along the direction, in which the response is low, may thereby be kept high. However, in such cases, it often occurs that the frequency emphasis becomes excessive with respect to the direction, in which the response is high, and an artifact occurs in the reproduced image.

SUMMARY OF THE INVENTION

The primary object of the present invention is to provide an image processing method, wherein frequency emphasis processing is carried out, and the levels of sharpness of a reproduced visible image along X and Y directions are adjusted to be approximately equal to each other.

Another object of the present invention is to provide an image processing method, wherein frequency emphasis processing is carried out, and an artifact is prevented from occurring in a reproduced visible image due to excessive frequency emphasis.

The specific object of the present invention is to provide an apparatus for carrying out the image processing method.

The present invention provides a first image processing method, comprising the steps of:

i) subjecting a digital image signal, which represents picture element values of picture elements arrayed along X and Y directions of an image, to operation processing carried out with the formula $$Q' = Q_{org} + \beta(Q_{org} - Q_{us}) \quad (1)$$

wherein $Q_{org}$ represents the original image signal representing each picture element, $Q_{us}$ represents an unsharp mask signal corresponding to super-low frequency with respect to the picture element, and $\beta$ represents an emphasis coefficient, and ii) feeding the image signal, which has been obtained from the operation processing, into an image reproducing apparatus, which is constituted to reproduce an image by operations for scanning along X and Y directions, wherein the operation processing is carried out with respect to the X and Y directions, under characteristics varying for different directions, and in accordance with a difference between responses of the image reproducing apparatus along the X and Y directions, whereby final levels of sharpness of a visible image, which is reproduced by the image reproducing apparatus, along the X and Y directions are adjusted to be approximately equal to each other.

Specifically, in the first image processing method in accordance with the present invention, in order for the operation processing to be carried out with respect to the X and Y directions and under characteristics varying for different directions, the operation processing may be firstly carried out with respect to one of the X and Y directions by setting the emphasis coefficient to be equal to $\beta_1$, and the operation processing may then be carried out on an image signal, which has been obtained from the operation processing and is taken as a new original image signal, and with respect to the other direction by setting the emphasis coefficient to be equal to $\beta_2$, where $\beta_1 \neq \beta_2$.

Alternatively, instead of the one-dimensional operation processing described above being carried out two times, two-dimensional filter processing, which is equivalent to the two times of one-dimensional operation processing, may be carried out on the original image signal Qorg.

The present invention also provides a second image processing method, comprising the steps of:

i) subjecting a digital image signal, which represents picture element values of picture elements arrayed along X and Y directions of an image, to operation processing carried out with Formula (1), and ii) feeding the image signal, which has been obtained from the operation processing, into an image reproducing apparatus, which is constituted to reproduce an image by operations for scanning along X and Y directions, wherein the operation processing is carried out with respect to only either one of the X and Y directions and in accordance with a difference between responses of the image reproducing apparatus along the X and Y directions, whereby final levels of sharpness of a visible image, which is reproduced by the image reproducing apparatus, along the X and Y directions are adjusted to be approximately equal to each other.

The present invention further provides a first image processing apparatus, comprising:

i) a means for subjecting a digital image signal, which represents picture element values of picture elements arrayed along X and Y directions of an image, to operation processing carried out with Formula (1), and ii) a means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to the X and Y directions and under characteristics varying for different directions.

Specifically, in the first image processing apparatus in accordance with the present invention, in order for the operation processing to be carried out with respect to the X and Y directions and under characteristics varying for different directions, the operation processing may be firstly carried out with respect to one of the X and Y directions by setting the emphasis coefficient to be equal to $\beta_1$, and the operation processing may then be carried out on an image signal, which has been obtained from the operation processing and is taken as a new original image signal, and with respect to the other direction by setting the emphasis coefficient to be equal to $\beta_2$, where $\beta_1 \neq \beta_2$.

Alternatively, instead of the one-dimensional operation processing described above being carried out two times, a two-dimensional filter processing, which is equivalent to the two times of one-dimensional operation processing, may be carried out on the original image signal Qorg.

The present invention still further provides a second image processing apparatus, comprising:

i) a means for subjecting a digital image signal, which represents picture element values of picture elements arrayed along X and Y directions of an image, to operation processing carried out with Formula (1), and ii) a means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to only either one of the X and Y directions.

With the image processing method and apparatus in accordance with the present invention, the operation processing is carried out with respect to the X and Y directions and under characteristics varying for different directions, or is carried out with respect to only either one of the X and Y directions. In this manner, a difference between the response of the image reproducing apparatus along the X direction and the response of the image reproducing apparatus along the Y direction can be compensated for, and final levels of sharpness of a visible image, which is reproduced by the image reproducing apparatus, along the X and Y directions can thereby be adjusted to be approximately equal to each other. Therefore, with the image processing method and apparatus in accordance with the present invention, the problems can be prevented from occurring in that the sharpness along one of the X and Y directions becomes low, and in that the frequency emphasis becomes excessive with respect one of the X and Y directions and an artifact occurs.

It is particularly advantageous that the image processing method and apparatus in accordance with the present invention is applied to the radiation image recording and reproducing system, wherein a stimulable phosphor sheet is utilized. In such cases, a visible radiation image having good image quality can be reproduced and used as an effective tool in, particularly, the accurate and efficient diagnosis of an illness. However, the effects described above can be obtained also when the image processing method and apparatus in accordance with the present invention is applied to systems other than the radiation image recording and reproducing system utilizing the stimulable phosphor sheet.

BRIEF DESCRIPTION OF THE DRAWINGS

FIG. 3 is an explanatory graph showing values of a frequency emphasis coefficient $\beta$, which are set such that a difference between response characteristics of an image reproducing apparatus along X and Y directions may be compensated for.

DESCRIPTION OF THE PREFERRED EMBODIMENTS

The present invention will hereinbelow be described in further detail with reference to the accompanying drawings.

Figure 1:
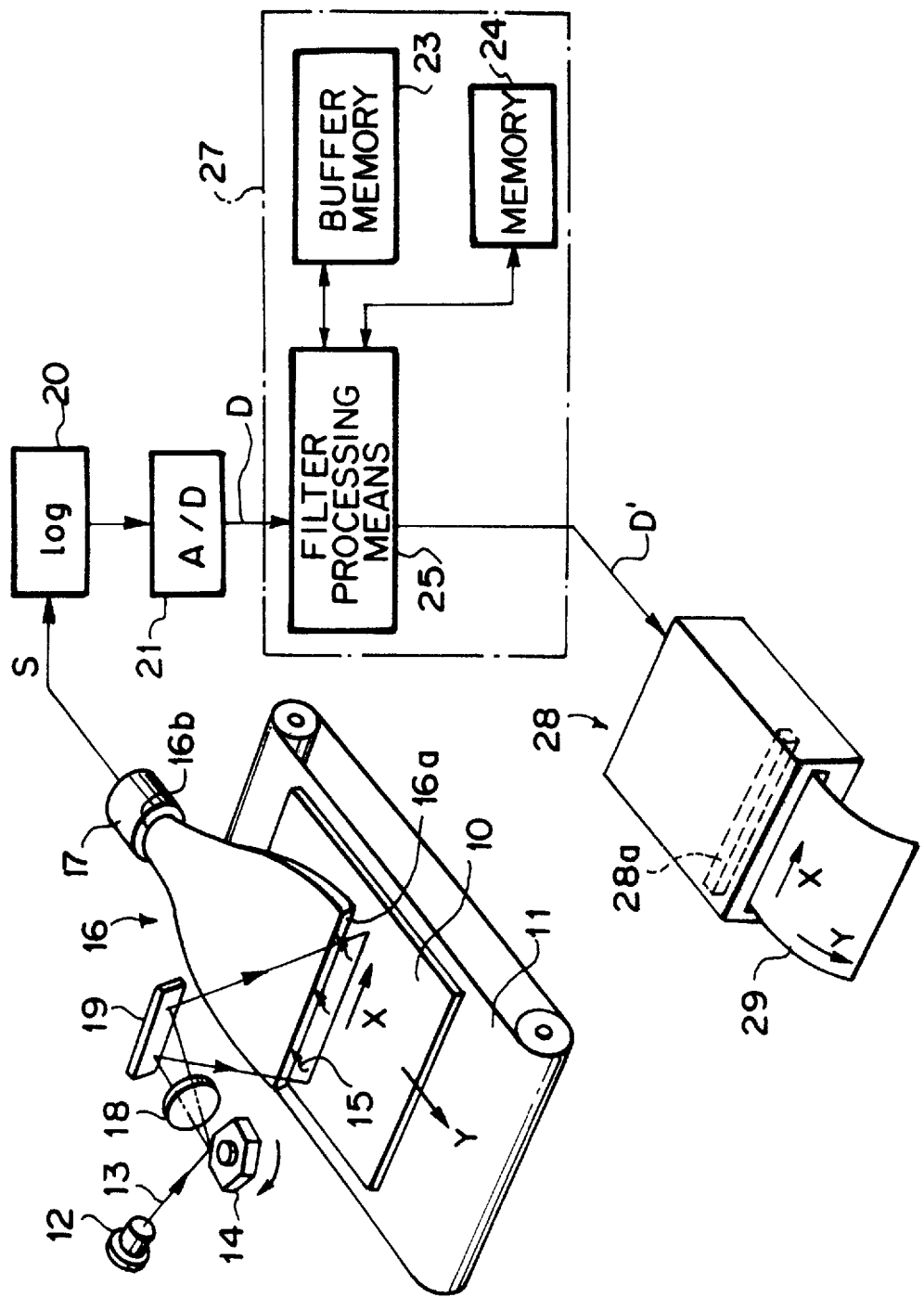
FIG. 1 is a schematic view showing an example of a radiation image read-out and reproducing system, in which frequency emphasis processing is carried out with an embodiment of the image processing method in accordance with the present invention.

FIG. 1 is a schematic view showing an example of a radiation image read-out and reproducing system, in which frequency emphasis processing is carried out with an embodiment of the image processing method in accordance with the present invention. In the radiation image read-out and reproducing system, a radiation image is read out from a stimulable phosphor sheet, on which the radiation image has been stored, and an image signal representing the radiation image is thereby obtained. Also, from the obtained image signal, a visible image is reproduced by a thermal recording apparatus.

With reference to FIG. 1, a stimulable phosphor sheet 10 has been exposed to radiation, such as X-rays, which has passed through an object. A radiation image of the object has thereby been stored on the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays (reading light), is produced by a stimulating ray source 12, such as a semiconductor laser, and is deflected by a rotating polygon mirror 14, which is rotated quickly. The laser beam 13 is then converged by a scanning lens 18, which is ordinarily constituted of an f θ lens. Thereafter, the laser beam 13 is reflected by a mirror 19, and is caused to scan the stimulable phosphor sheet 10 in a main scanning direction indicated by the double headed arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17, which serves as a photodetector.

The light guide member 16 is made from a light guiding material such as an acrylic plate and has a linear light input face 16a, positioned so that it may extend along the main scanning line on the stimulable phosphor sheet 10, and a ring-shaped light output face 16b, positioned so that it may be in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image, is converted into an electric signal by the photomultiplier 17.

In the manner described above, an analog output signal (image signal) S is generated by the photomultiplier 17. The analog output signal S is amplified by a logarithmic amplifier 20 and is then digitized into a digital image signal D with a predetermined scale factor in an A/D converter 21. The digital image signal D, which has thus been obtained and represents the two-dimensional image, is fed into an image processing apparatus 27. In the image processing apparatus 27, the digital image signal D is subjected to image processing, such as gradation processing or frequency emphasis processing. An image signal D' is thus obtained from the image processing apparatus 27. The image signal D' is then fed into a thermal recording apparatus 28, which is provided with a thermal head 28a. In the thermal recording apparatus 28, a two-dimensional visible image is reproduced as a hard copy 29 from the image signal D'.

How the frequency emphasis processing is carried out in the image processing apparatus 27 will be described hereinbelow.

The image processing apparatus 27 comprises a buffer memory 23 for temporarily storing the digital image signal, which represents the picture element values of picture elements of a single image, and a memory 24 for storing information representing the values of a emphasis coefficient β, which will be described later. The image processing apparatus 27 also comprises a filter processing means 25. Firstly, for each scanning line extending in an X direction (i.e., the main scanning direction), filter processing is carried out on the original image signal Qorg representing the picture elements, which are located along the scanning line. The filter processing corresponds to the operation processing carried out with the formula $$Q' = Qorg + \beta(Qorg - Qus)$$

wherein β represents the emphasis coefficient, and Qus represents the unsharp mask signal corresponding to the super-low frequency with respect to each picture element. In cases where the mask size is equal to N and the total sum of the picture element values of the picture elements, which are located within the mask, is equal to Σ, the formula of Qus=Σ/N obtains.

For example, in cases where N=3 and the values of the original image signal representing three picture elements, which are arrayed along the X direction, are represented by $x_1$, $x_2$, and $x_3$, the value of Q' with respect to the original image signal $x_2$, which represents the middle picture element among the three picture elements, is calculated with the formula $$\begin{aligned} Q' &= x_2 + \beta\{x_2 - (x_1 + x_2 + x_3)/3\} \\ &= (-\beta/3)x_1 + (1 + 2\beta/3)x_2 + (-\beta/3)x_3 \end{aligned}$$

Therefore, the filter processing for the replacement with Formula (2) is carried out.

$$x_2' = ax_1 + bx_2 + cx_3 \quad (2)$$
$$(b = 1 + 2\beta/3, a = c = -\beta/3)$$

Thereafter, in the image processing apparatus 27, the image signal, which has been obtained from the filter processing described above, is taken as an original image signal, and the filter processing with Formula (2) is carried out for each picture element column, which extends in the Y direction (i.e., the sub-scanning direction).

Figure 2:
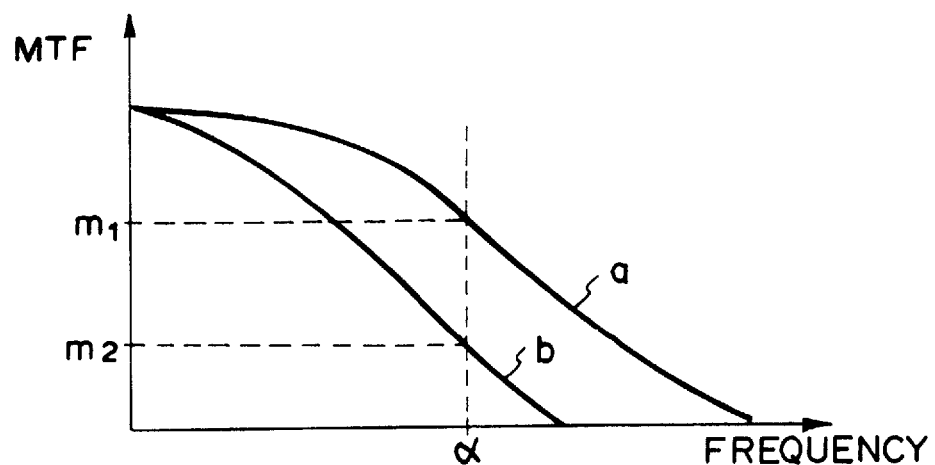
FIG. 2 is a graph showing response characteristics of an image reproducing apparatus along X and Y directions.
Figure 3:
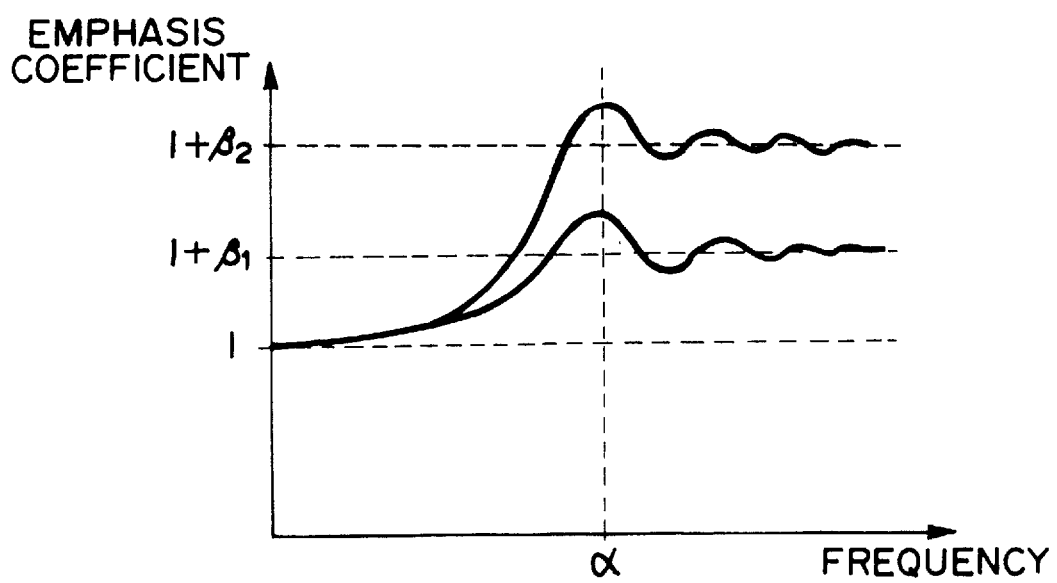

In the first filter processing and the second filter processing, the emphasis coefficient β is set to be different values ($\beta_1$ and $\beta_2$). The emphasis coefficient $\beta_1$, which is set in the first filter processing, and the emphasis coefficient $\beta_2$, which is set in the second filter processing, are determined in accordance with the difference between the response of the thermal recording apparatus 28 along the X direction and the response of the thermal recording apparatus 28 along the Y direction. Specifically, by way of example, the response characteristics of the thermal recording apparatus 28 along the X direction may be indicated by curve "a" in FIG. 2, and the response characteristics of the thermal recording apparatus 28 along the Y direction may be indicated by curve "b"

in FIG. 2. The frequency, at which the levels of sharpness along the X and Y directions are to be primarily adjusted to be equal to each other, may be a frequency $\alpha$. The modulation transfer function (MTF) along the X direction, which MTF corresponds to the frequency $\alpha$, may be $m_1$, and the modulation transfer function (MTF) along the Y direction, which MTF corresponds to the frequency $\alpha$, may be $m_2$. In such cases, as illustrated in FIG. 3, the emphasis coefficient $\beta_1$, and the emphasis coefficient $\beta_2$ are set to be different values, which satisfy the relationship of $m_1/m_2=(1+\beta_2)/(1+\beta_1)$.

The filter processing is carried out in the manner described above, and the frequency components, which are not lower than the super-low frequency, are thereby emphasized. From the image signal obtained from the filter processing, a visible radiation image is then reproduced as the hard copy 29 by the thermal recording apparatus 28. In this manner, a visible image can be obtained, in which the frequency region related to a diagnosis, or the like, has been emphasized markedly, in which the sharpness has been enhanced, and which has good image quality and can serve as an effective tool in, particularly, the efficient and accurate diagnosis of an illness. The effects of the aforesaid processing are described in more detail in U.S. Pat. No. 4,315,318.

Also, in cases where the emphasis coefficient $\beta_1$, in the first filter processing and the emphasis coefficient $\beta_2$ in the second filter processing are set in the manner described above, the difference between the response characteristics of the thermal recording apparatus 28 along X and Y directions can be compensated for, and the reproduced visible image can be obtained with the thermal recording apparatus 28, in which image the levels of sharpness along the X and Y directions are approximately equal to each other primarily at the frequency $\alpha$.

The memory 24 of the image processing apparatus 27 should preferably store information representing the combinations of the values of the emphasis coefficient $\beta_1$ and the emphasis coefficient $\beta_2$ with respect to different levels of the frequency $\alpha$ at which the levels of sharpness along the X and Y directions are to be primarily adjusted to be equal to each other. The values of the emphasis coefficient $\beta_1$ and the emphasis coefficient $\beta_2$ should preferably be read from the memory 24 in accordance with the desired level of the frequency a and set in the filter processing means 25.

In the embodiment described above, the filter processing with respect to a one-dimensional direction is carried out two times. Alternatively, two-dimensional filter processing, which is equivalent to the two times of one-dimensional filter processing, may be carried out one time, and the same effects may thereby be obtained. An embodiment of the two-dimensional filter processing will be described hereinbelow.

With respect to the X direction, the emphasis coefficient is set to be equal to $\beta_1$, and it is assumed that the coefficients of the filter processing in Formula (2) shown above become equal to a, b, and c. Also, with respect to the Y direction, the emphasis coefficient is set to be equal to $\beta_2$, and it is assumed that the coefficients of the filter processing in Formula (2) shown above become equal to a', b', and c'.

In such cases, a two-dimensional filter, which achieves the same effects as the two times of one-dimensional filter processing, wherein the filter processing described above is firstly carried out on the original image signal with respect to the X direction by using the emphasis coefficient $\beta_1$ and wherein the filter processing is then carried out on the processed image signal with respect to the Y direction by using the emphasis coefficient $\beta_2$, is represented by the determinant shown below.

$$\begin{pmatrix} a' \\ b' \\ c' \end{pmatrix} (a\ b\ c) = \begin{pmatrix} a'a & a'b & a'c \\ b'a & b'b & b'c \\ c'a & c'b & c'c \end{pmatrix}$$

The values of the original image signal representing 3×3 picture elements are multiplied by the respective elements of the aforesaid two-dimensional filter, and the obtained products are added to one another. In this manner, a converted image signal with respect to the picture element located at the middle position can be obtained specifically, by way of example, the values of the original image signal representing the 3×3 picture elements may be represented as shown below.

$x_1 \quad x_2 \quad x_3$ $x_1' \quad x_2' \quad x_3'$ $x_1'' \quad x_2'' \quad x_3''$ In such cases, the original image signal $x_2'$ representing the picture element located at the middle position is converted to an image signal Q', which is calculated with the formula shown below.

$Q' = a'\ ax_1 + a'\ bx_2 + a'\ cx_3 + b'\ ax_1' +$ $b'\ bx_2' + b'\ cx_3' + c'\ ax_1'' + c'\ bx_2'' + c'\ cx_3''$

In the embodiments described above, the filter processing is carried out under the characteristics varying for the X and Y directions, and the difference between the response characteristics of the thermal recording apparatus 28 along X and Y directions is thereby compensated for. Alternatively, the filter processing may be carried out with respect to only either one of the X and Y directions in accordance with the difference in the response characteristics, and the difference between the response characteristics of the thermal recording apparatus 28 along X and Y directions may thereby be compensated for.

What is claimed is:

1. An image processing method, comprising the steps of:
   i) subjecting a digital image signal, which represents picture element values of picture elements arrayed along X and Y directions of an image, to operation processing carried out with the formula Q'=Qorg+β(Qorg−Qus)

wherein Qorg represents the original image signal representing each picture element, Qus represents an unsharp mask signal corresponding to super-low frequency with respect to the picture element, and β represents an emphasis coefficient, and
   ii) feeding the image signal, which has been obtained from the operation processing, into an image reproducing apparatus, which is constituted to reproduce an image by operations for scanning along X and Y directions,
   wherein the operation processing is carried out with respect to the X and Y directions, the operation processing with respect to the X direction being performed with a different emphasis coefficient than with respect to the Y direction, the respective emphasis coefficient for the X direction and the respective emphasis coefficient for the Y direction being set in accordance with a difference between responses of the image reproducing apparatus along the X and Y directions so that final levels of sharpness of a visible image reproduced by the image reproducing apparatus, along the X and Y directions, are substantially equal to each other.

2. A method as defined in claim 1 wherein the digital image signal has been obtained by reading out a radiation image.

3. A method as defined in claim 2 wherein said radiation image has been stored on a stimulable phosphor sheet, and the digital image signal has been obtained by exposing said stimulable phosphor sheet, on which said radiation image has been stored, to stimulating rays, which cause said stimulable phosphor sheet to emit light in proportion to the amount of energy stored thereon during its exposure to radiation, photoelectrically detecting the emitted light, an image signal being thereby obtained, and digitizing the image signal.

4. An image processing method, comprising the steps of:
i) subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) feeding the image signal, which has been obtained from the operation processing, into an image reproducing apparatus, which is constituted to reproduce an image by operations for scanning along X and Y directions, wherein the operation processing is carried out with respect to the X and Y directions, under characteristics varying for different directions, and in accordance with a difference between responses of the image reproducing apparatus along the X and Y directions, whereby final levels of sharpness of a visible image, which is reproduced by the image reproducing apparatus, along the X and Y directions are adjusted to be substantially equal to each other, wherein the operation processing is firstly carried out with respect to one of the X and Y directions by setting the emphasis coefficient to be equal to $\beta_1$, and wherein the operation processing is then carried out on an image signal, which has been obtained from the operation processing and is taken as a new original image signal, and with respect to the other direction by setting the emphasis coefficient to be equal to $\beta_2$, where $\beta_1 \neq \beta_2$.

5. An image processing method, comprising the steps of:
i) subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) feeding the image signal, which has been obtained from the operation processing, into an image reproducing apparatus, which is constituted to reproduce an image by operations for scanning along X and Y directions, wherein the operation processing is carried out with respect to the X and Y directions, under characteristics varying for different directions, and in accordance with a difference between responses of the image reproducing apparatus along the X and Y directions, whereby final levels of sharpness of a visible image, which is reproduced by the image reproducing apparatus, along the X and Y directions are adjusted to be substantially equal to each other, and wherein two-dimensional filter processing is carried out on the original image signal, said two-dimensional filter processing comprising the steps of:
firstly carrying out the operation processing with respect to one of the X and Y directions by setting the emphasis coefficient to be equal to $\beta_1$, and thereafter carrying out the operation processing on an image signal, which has been obtained from the operation processing and is taken as a new original image signal, and with respect to the other direction by setting the emphasis coefficient to be equal to $\beta_2$, where $\beta_1 \neq \beta_2$.

6. An image processing method, comprising the steps of:
i) subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) feeding the image signal, which has been obtained from the operation processing, into an image reproducing apparatus, which is constituted to reproduce an image by operations for scanning along X and Y directions, wherein the operation processing is carried out with respect to only either one of the X and Y directions, said emphasis coefficient being selected based on a difference between responses of the image reproducing apparatus along the X and Y directions so that, in a visible image reproduced by the image reproducing apparatus after the operation processing with the selected emphasis coefficient, final levels of sharpness along the X and Y directions are substantially equal to each other.

7. A method as defined in claim 6 wherein the digital image signal has been obtained by reading out a radiation image.

8. A method as defined in claim 7 wherein said radiation image has been stored on a stimulable phosphor sheet, and the digital image signal has been obtained by exposing said stimulable phosphor sheet, on which said radiation image has been stored, to stimulating rays, which cause said stimulable phosphor sheet to emit light in proportion to the amount of energy stored thereon during its exposure to radiation, photoelectrically detecting the emitted light, an image signal being thereby obtained, and digitizing the image signal.

9. An image processing apparatus, comprising:
i) means for subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to the X and Y directions, the operation processing with respect to the X direction being performed with a different emphasis coefficient than with respect to the Y direction, the respective emphasis coefficient for the X direction and the respective emphasis coefficient for the Y direction being set in accordance with a difference between responses of the image reproducing apparatus along the X and Y directions so that final levels of sharpness of a visible image reproduced by the image reproducing apparatus, along the X and Y directions, are substantially equal to each other.

10. An image processing apparatus as defined in claim 9 wherein the digital image signal has been obtained by reading out a radiation image.

11. An image processing apparatus as defined in claim 10 wherein said radiation image has been stored on a stimulable phosphor sheet, and the digital image signal has been obtained by exposing said stimulable phosphor sheet, on which said radiation image has been stored, to stimulating rays, which cause said stimulable phosphor sheet to emit light in proportion to the amount of energy stored thereon during its exposure to radiation, photoelectrically detecting the emitted light, an image signal being thereby obtained, and digitizing the image signal.

12. An image processing apparatus, comprising:

i) means for subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to the X and Y directions and under characteristics varying for different directions, wherein the operation processing is firstly carried out with respect to one of the X and Y directions by setting the emphasis coefficient to be equal to $\beta_1$, and wherein the operation processing is then carried out on an image signal, which has been obtained from the operation processing and is taken as a new original image signal, and with respect to the other direction by setting the emphasis coefficient to be equal to $\beta_2$, where $\beta_1 \neq \beta_2$.

13. An image processing apparatus, comprising:

i) means for subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to the X and Y directions and under characteristics varying for different directions, and wherein two-dimensional filter processing is carried out on the original image signal, said two-dimensional filter processing comprising the steps of:

firstly carrying out the operation processing with respect to one of the X and Y directions by setting the emphasis coefficient to be equal to $\beta_1$, and thereafter carrying out the operation processing on an image signal, which has been obtained from the operation processing and is taken as a new original image signal, and with respect to the other direction by setting the emphasis coefficient to be equal to $\beta_2$, where $\beta_1 \neq \beta_2$.

14. An image processing apparatus, comprising:

i) means for subjecting a digital image signal, which represents picture element values of picture elements arrayed along X and Y directions of an image, to operation processing carried out with the formula $$Q'=Qorg+\beta(Qorg-Qus)$$

wherein Qorg represents the original image signal representing each picture element, Qus represents an unsharp mask signal corresponding to super-low frequency with respect to the picture element, and $\beta$ represents an emphasis coefficient, and ii) means for feeding the image signal, which has been obtained from the operation processing, into an image reproducing apparatus, which is constituted to reproduce an image by operations for scanning along X and Y directions, wherein the image processing apparatus is provided with a function for carrying out the operation processing with respect to only either one of the X and Y directions, said emphasis coefficient being selected based on a difference between responses of the image reproducing apparatus along the X and Y directions so that, in a visible image reproduced by the image reproducing apparatus after the operation processing with the selected emphasis coefficient, final levels of sharpness along the X and Y directions are substantially equal to each other.

15. An image processing apparatus as defined in claim 14 wherein the digital image signal has been obtained by reading out a radiation image.

16. An image processing apparatus as defined in claim 15 wherein said radiation image has been stored on a stimulable phosphor sheet, and the digital image signal has been obtained by exposing said stimulable phosphor sheet, on which said radiation image has been stored, to stimulating rays, which cause said stimulable phosphor sheet to emit light in proportion to the amount of energy stored thereon during its exposure to radiation, photoelectrically detecting the emitted light, an image signal being thereby obtained, and digitizing the image signal.

* * * * *